(12) United States Patent
Cavanaugh et al.

(10) Patent No.: US 6,401,348 B1
(45) Date of Patent: Jun. 11, 2002

(54) ELECTRODYNAMIC ROTATIONAL AXIS ACQUISITION TOOL

(76) Inventors: Matthew Francis Cavanaugh, 11906 Brookwood Cir., Austin, TX (US) 78750; Bobby Joe Luce, Rte. 2 Box 80RR, Manor, TX (US) 78653

( * ) Notice: Subject to any disclaimer, the term of this patent is extended or adjusted under 35 U.S.C. 154(b) by 0 days.

(21) Appl. No.: 09/496,781

(22) Filed: Feb. 3, 2000

(51) Int. Cl.[7] .............................. G01B 5/24; B23B 25/06
(52) U.S. Cl. .............................. 33/502; 33/642; 33/645; 82/170
(58) Field of Search .................. 33/502, 520, 613, 33/626, 628, 630, 632, 633, 634, 642, 645; 73/1.01, 1.79, 1.81, 1.88; 82/151, 170

(56) References Cited

U.S. PATENT DOCUMENTS

| | | | | |
|---|---|---|---|---|
| 1,252,777 A | * | 1/1918 | Casler | 33/642 |
| 1,936,160 A | | 11/1933 | George | 33/502 |
| 1,984,864 A | * | 12/1934 | Cole et al. | 33/642 |
| 3,470,618 A | * | 10/1969 | Richer | 33/639 |
| 3,601,897 A | * | 8/1971 | Muller | 33/642 |
| 3,618,434 A | | 11/1971 | Nault | 451/9 |
| 3,891,016 A | | 6/1975 | Nilberg | 33/504 |
| 3,900,732 A | | 8/1975 | Costales | 250/231.13 |
| 3,999,299 A | * | 12/1976 | Johnson | 33/639 |
| 4,218,825 A | | 8/1980 | Asakura et al. | 33/504 |
| 4,269,000 A | | 5/1981 | Rutter | 451/9 |
| 4,447,956 A | * | 5/1984 | Chung | 33/520 |
| 4,837,941 A | * | 6/1989 | Mullins | 33/626 |
| 4,879,817 A | | 11/1989 | McMurtry | 33/502 |
| 5,276,975 A | * | 1/1994 | Fisher | 33/642 |

OTHER PUBLICATIONS

Swiss Precision Instruments Inc. Product Brochure, "Shop Aids", pp. 56–59, 1991.

* cited by examiner

Primary Examiner—Diego Gutierrez
Assistant Examiner—R Alexander Smith

(57) ABSTRACT

A rotational acquisition tool has a rotatable mounting body including a first side and a second side opposite the first side. A sleeve has a first end fixedly mounted in the body and a second end extending from the first side. A dynamic cylinder is mounted on the sleeve and includes a radial face slidably abutting the second end of the sleeve. A resilient member is retained in the sleeve and is engaged with the dynamic cylinder for exerting a tensile force on the dynamic cylinder sufficient to maintain relative positioning of the radial face on the sleeve.

19 Claims, 4 Drawing Sheets

ELECTRODYNAMIC ROTATIONAL AXIS ACQUISITION TOOL

BACKGROUND

The disclosures herein related generally to lathes and more particularly to an attachment used to acquire the dynamic relationship between the rotational axis of the lathe and the cutting tools used therewith.

In manufacturing there are processes that are used to cut and shape metal into desired geometries. One of these processes is known as turning. The equipment used in turning is called a lathe. The name turning, comes from the fact that the material to be cut, turns (rotates) about an axis. The cutting tool is external to the rotating material. The cutting tool approaches the material in a radial direction toward the rotational axis. As the tool comes in contact with the material, it removes material at a certain radial distance from the rotational axis.

The problem that exists, is acquiring the location of the rotational axis in relation to the cutting tool in the radial direction, to some level of precision. This requires precisely determining the relationship between a cutting tool and the rotational axis of a turning machine.

There are many approaches to acquiring the relationship between the rotational axis of the lathe and the cutting tool. Some, but not all, take into account the dynamic aspect of the relationship.

The traditional and oldest method of acquiring the relationship between the rotational dynamic axis of a lathe and the cutting tool, in the radial direction, is an iterative method known as the Cut/Measure/Cut method. In this method the operator will cut a part, measure the part and continue to cut and measure until the desired result is achieved. A variation of this method is to cut, measure and mathematically calculate the relationship, and make the final cut which achieves the desired result. These methods can result in material waste. The precision of both of these methods is highly dependent on the skill level of the machine operator.

The latest and most sophisticated method to define the relationship between the tool and the rotational axis is to use an electronic integrated probe. This is a device that is electronically and mechanically integrated into the operation of the machine. The probe is external to the rotational dynamic system. The probe is typically fixed to a surface near the rotational axis.

The traditional cut and measure approach is typically used to define the relationship between the probe and the rotational axis. From this point on, the relationship between the tool and the rotational axis is defined through the use of the probe.

The precision of the electronic integrated probe method is also highly dependent on the skill level of the operator initially defining the relationship between the probe and the rotational axis. In addition, if the relationship between the probe and the rotational axis changes, the probe will not detect this or compensate for it.

There is also static electronic probes that can be positioned on the rotational axis of a lathe, but they are designed to be used statically not rotating. These probes have names such as "electric locating gages, electronic edge finder, electronic tool setter, electronic centering gage, electronic sensor and electronic offset gage".

There are also dynamic probes that can find the rotational axis of the lathe. However, these probes do not incorporate an electronic circuit for acquiring the rotational axis. These dynamic probes have names such as "edge finders, center finders and wiggler".

U.S. Pat. No. 4,269,000 discloses an alignment fixture for use with an adjustable spindle nose device that rotatably supports a working member such as a honing mandrel to axially align the mandrel so that it rotates about a fixed axis along its length. The fixture comprises a housing having attached structure for mounting on a machine adjacent to a rotatable member to be aligned, an adjustable contact assembly including a first contact member mounted on the housing in position to engage the member to be aligned at one location therealong, a second contact assembly including a second contact member spaced from the first contact member for engaging the member to be aligned, apparatus for movably supporting the second contact assembly on the housing in position so that the second contact member is biased into engagement with the member to be aligned at a location axially spaced from the adjustable contact, an indicator assembly on the housing including a graduated scale and an indicator member movable relative to the scale, an operative connection between the second contact assembly and the movable indicator member whereby the indicator member indicates on the scale the position of the second contact member relative to the first contact member when both contacts are engaged with the member to be aligned, and apparatus for adjusting the position of the housing and the first and second contact assemblies thereon relative to the member after it is aligned to laterally locate the rotatable member.

In U.S. Pat. No. 4,879,817, a tool-setting probe has a stylus tip for contacting the tool tip, for setting the cutting tip of a cutting tool of a lathe. The stylus tip is generally cube-shaped. In addition to a conventional vertical datum surface for setting the tool in the horizontal direction, it has a 45E sloping datum surface. The tool is touched against both surfaces. The horizontal difference between the two contact positions is a measure of the height of the tool tip, enabling it to be set in the vertical direction.

Therefore, what is needed is a device for acquiring the location of the rotational axis in relation to the cutting tool in the radial direction.

SUMMARY

One embodiment, accordingly, provides a rotational axis acquisition tool taking into consideration the dynamics of the centerline of a cylinder, a simple series circuit and a knowledge of the process. To this end, a rotational axis acquisition tool includes a rotatable mounting body having a first side and a second side opposite the first side. A sleeve has a first end fixedly mounted in the body and a second end extending from the first side. A dynamic cylinder is mounted on the sleeve and includes a radial face slidably abutting the second end of the sleeve. A resilient member is retained in the sleeve and is engaged for exerting a tensile force on the dynamic cylinder sufficient to maintain relative positioning of the radial face on the sleeve.

A principal advantage of this embodiment is the substantial limitation of material waste. With the Cut Measure Cut method there is always the chance that the operator will cut too much material resulting in a wasted piece. The other common approach is to have a set up piece which is discarded, resulting in waste. In addition, as the precision of the dimension desired increases, more cuts are typically required to achieve this higher precision. This increases the amount of time required to produce the part or parts, which is time waste.

BRIEF DESCRIPTION OF THE DRAWING FIGURES

DETAILED DESCRIPTION

Figure 1:
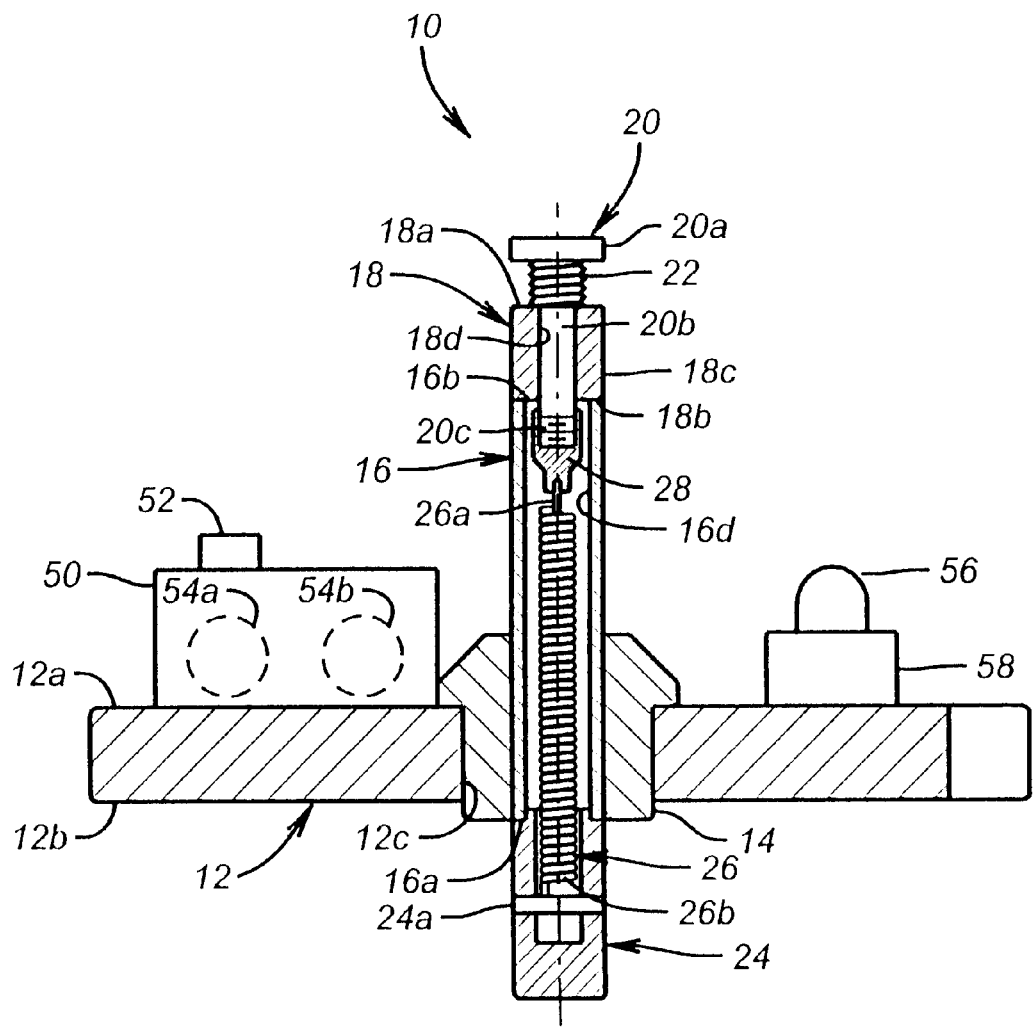
FIG. 1 is a cross-sectional side view illustrating an embodiment of an electrodynamic rotational acquisition tool.

Referring now to FIG. 1, a rotational acquisition tool is generally designated 10 and includes a mounting body 12, an insulator sleeve 14 seated in the mounting body 12, a body sleeve 16 seated in the insulator sleeve 14, a dynamic cylinder 18 seated on the body sleeve 16, a tool reference probe 20 inserted into the dynamic cylinder 18, and a compressible member 22 seated between the tool reference probe 20 and the dynamic cylinder 18. A retainer cap 24 is also seated on the body sleeve 16, and a resilient member 26 is engaged between the retainer cap 24 and a retainer 28 attached to the tool reference probe 20.

The mounting body 12 is preferably a steel disk-shaped member having a first planar side 12a and a second planar side 12b. An aperture 12c is formed through body 12 between the first side 12a and the second side 12b. The insulator sleeve 14 is mounted in the aperture 12c. Body sleeve 16 has a first end 16a fixedly seated in the insulator sleeve 14 and has a second end 16b extending from the first side 12a of body 12. An aperture 16d extends through sleeve 16. The dynamic cylinder 18 includes a first radial face 18a, a second radial face 18b and an annular peripheral surface 18c. An aperture 18d extends through cylinder 18. Second radial face 18b seats on second end 16b of body sleeve 16.

The tool reference probe 20 includes a cap 20a and a stem 20b. Stem 20b includes a threaded portion 20c. Stem 20b extends through aperture 18d and threaded portion 20c of stem 20b is threadably engaged with retainer 28. The compressible member 22, preferably a compression spring, is mounted on stem 20b between cap 20a and first radial face 18a.

Retainer cap 24 is seated on first end 16a of body sleeve 16 adjacent second side 12b of mounting body 12. A retainer pin 24a extends through retainer cap 24. The resilient member 26 has a first end 26a engaged with retainer 28 and has a second end 26b engaged with retainer pin 24a.

Figure 5:
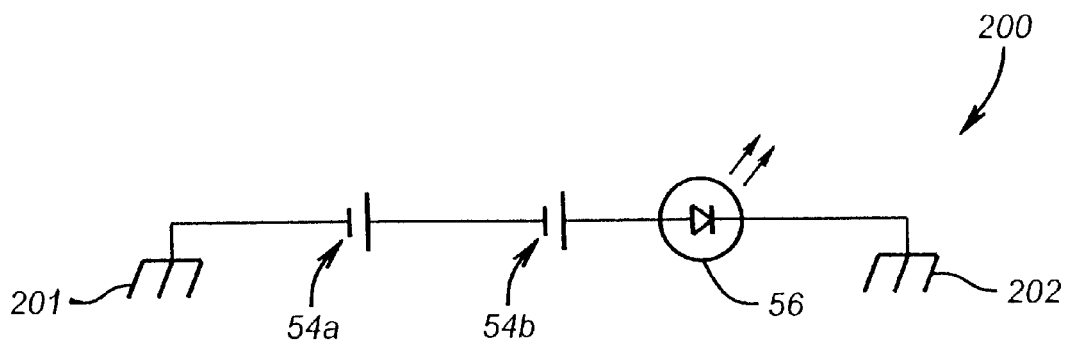
FIG. 5 is a diagrammatic view illustrating an embodiment of a circuit for use with the tool of FIGS. 1 and 4.

Mounting body 12 carries a battery box 50 secured to first side 12a of mounting body 12 by assembly screws 52, only one of which is shown in FIG. 1. A plurality of batteries 54a, 54b are mounted in box 50. A light emitting diode (LED) 56 is also mounted on first side 12a of mounting body 12 by means of a mounting block 58. LED 56 and batteries 54a, 54b are connected as depicted by a circuit 200 illustrated in FIG. 5 and discussed below in further detail. One end 201 of circuit 200 is connected to mounting body 12 and another end 202 of circuit 200 is connected to body sleeve 16.

Figure 2:
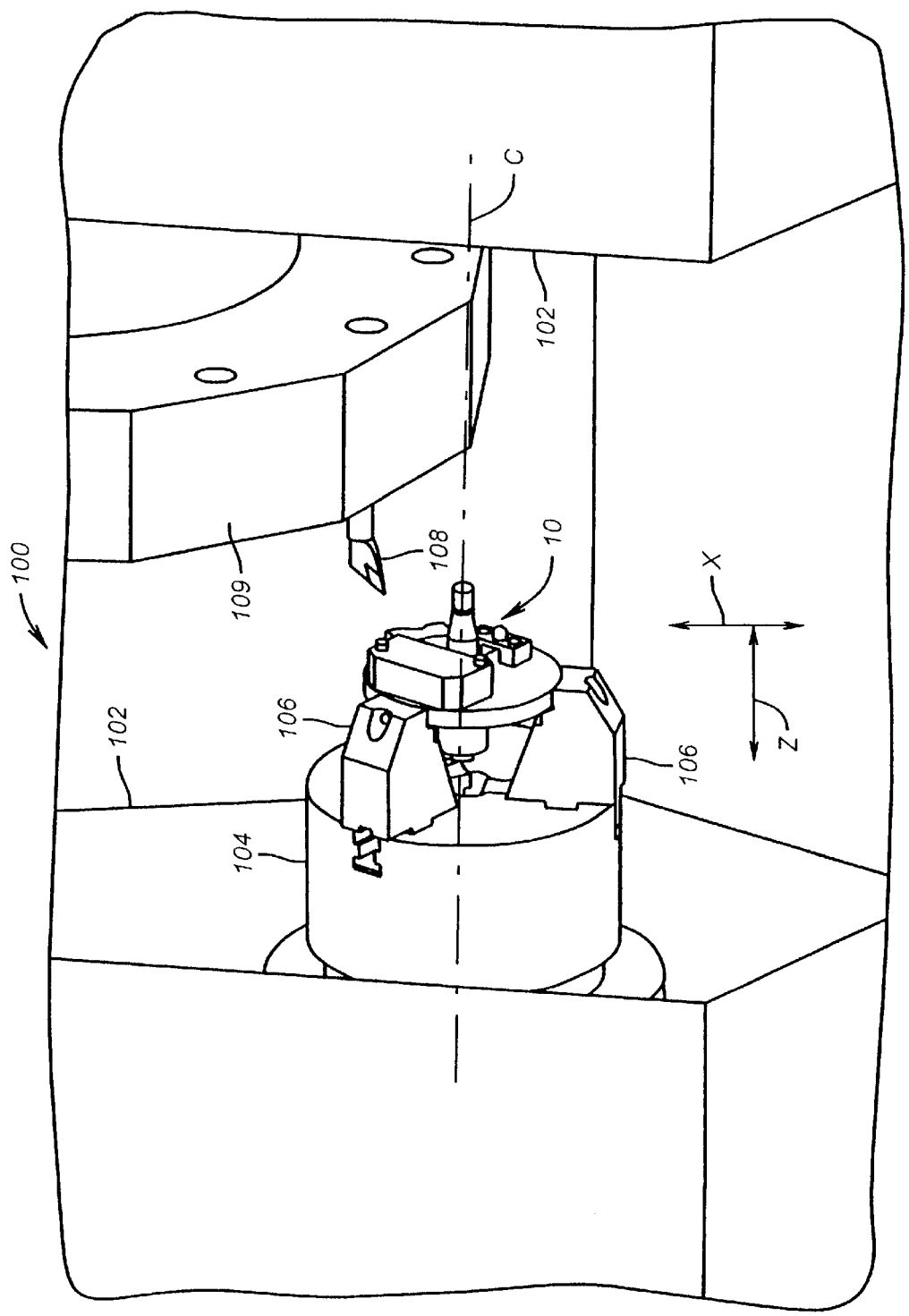
FIG. 2 is a perspective view illustrating an embodiment of a machine tool system.
Figure 3:
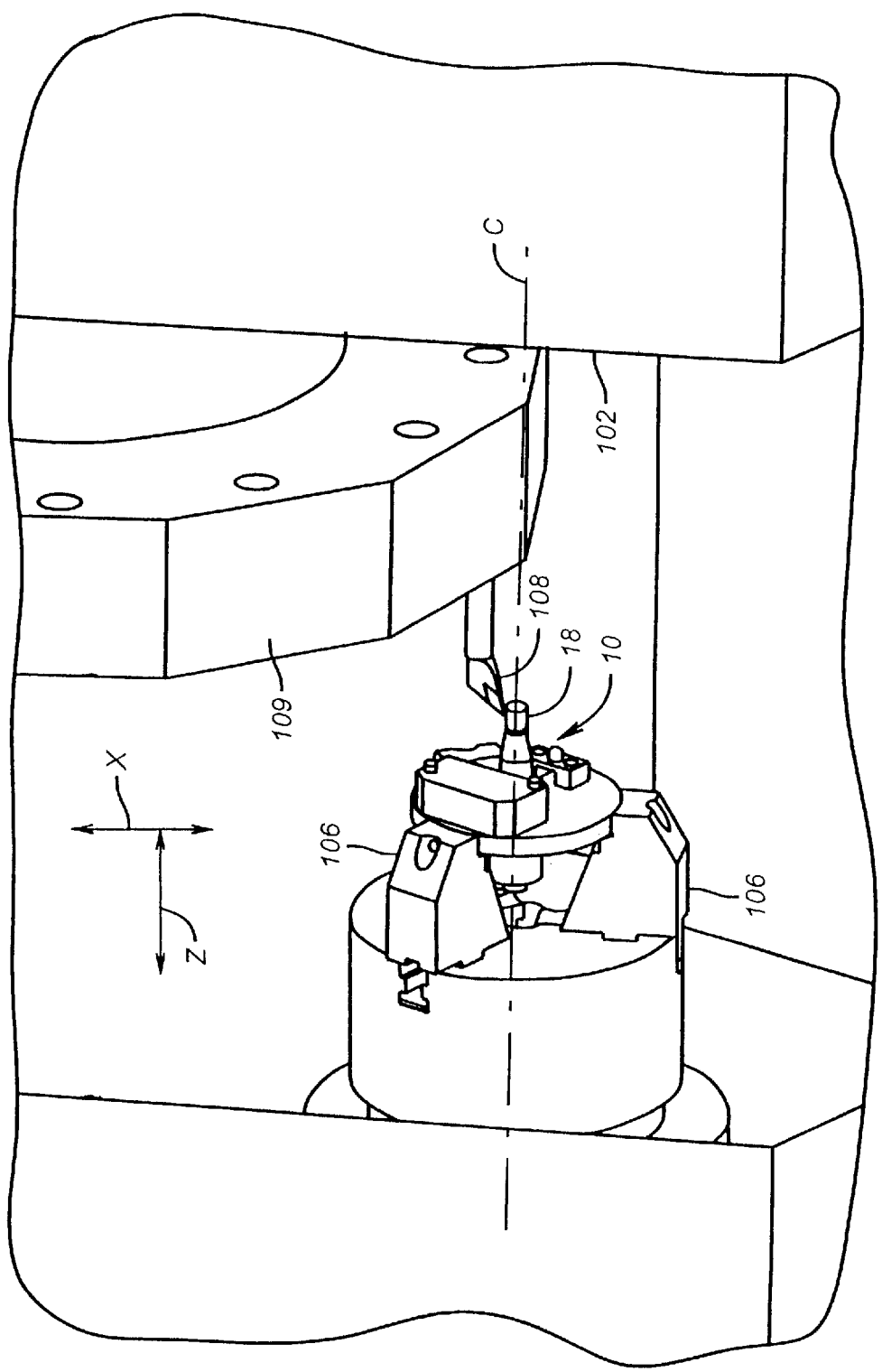
FIG. 3 is another perspective view of the machine tool system of FIG. 2.

The rotational axis acquisition tool 10 may be used in a machine tool system 100, FIG. 2. The system 100 includes a machine tool 102 having a true dynamic system centerline, designated C. A spindle 104 includes jaws 106 which are movable in a well-known manner and may be moved to grip the tool 10. Spindle 104 is rotatable about the centerline C. A cutting tool 108 is mounted on a turret 109 which is part of machine tool 102. In this manner, cutting tool 108 is movable along a pair of coordinate axes including an axially extending Z axis and a radially extending X axis into engagement with a workpiece (not shown) which may be held by jaws 106. In FIG. 3, cutting tool 108 is illustrated as having been positioned along its Z and X axes for contact with the dynamic cylinder 18 of rotational axis acquisition tool 10 for the purpose of determining the true dynamic centerline C of system 100 prior to a cutting operation to be performed on a workpiece to be held in jaws 106 after the centerline C is determined and tool 10 is removed. When cutting tool 108 contacts dynamic cylinder 18, circuit 200 is closed through the connected conductive elements of machine tool 102 so that LED 56 is illuminated. When cylinder 18 is off center, i.e. not coaxial with centerline C, the contact and illumination are intermittent. However, after tool 108 moves cylinder 18 into co-axial alignment with the centerline C, the contact and illumination remain constant.

Figure 4:
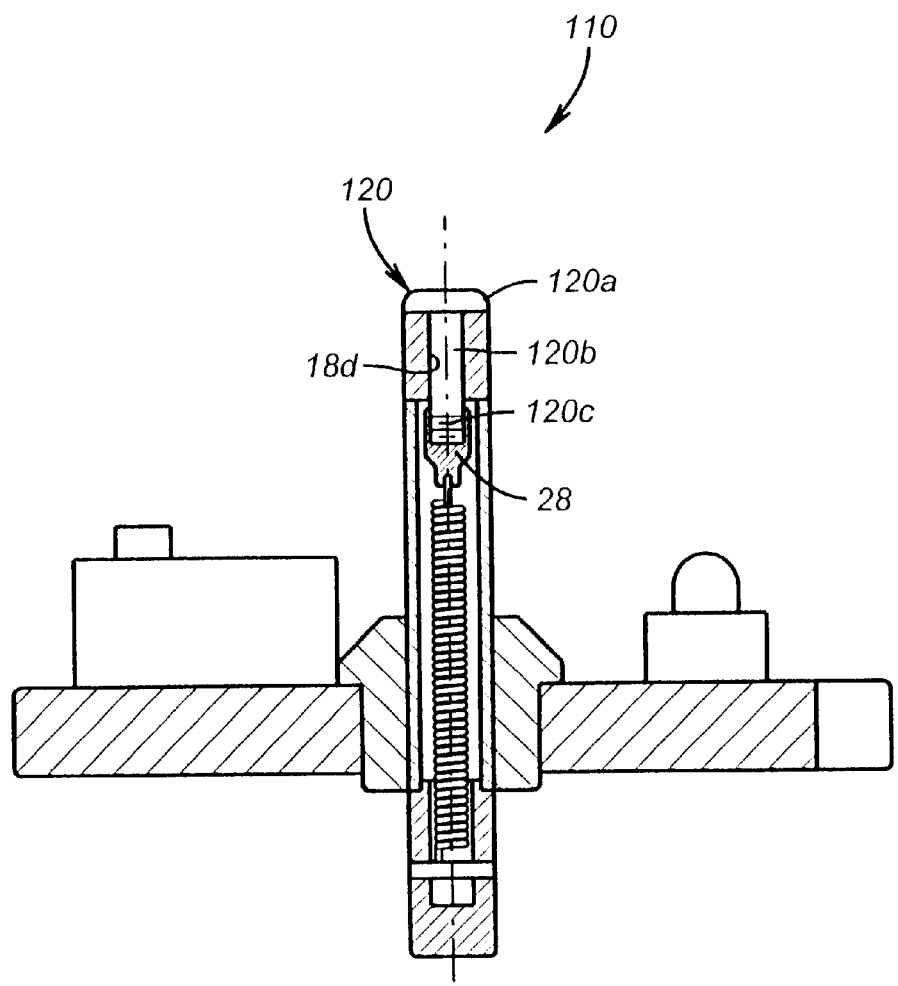
FIG. 4 is a cross-sectional side view illustrating another embodiment of an electrodynamic rotational acquisition tool.

In another embodiment of a rotational acquisition tool 110, FIG. 4, the compression spring 22 and tool reference probe 20 illustrated in FIG. 1, are replaced with a cylinder retainer 120 including a cap 120a and a stem 120b. Stem 120b includes a threaded portion 120c. Stem 120b extends through aperture 18d and threaded portion 120c of stem 120b is threadably engaged with retainer 28. The remaining components of the rotational acquisition tool 110 of FIG. 4, are the same as the rotational acquisition tool 10 of FIG. 1.

In operation, when a cylinder with a constant diameter over its length is rotated about the centerline of its diameter, the outside surface remains at a fixed distance relative to the centerline. If the centerline of the cylinders diameter is coaxial with the rotational axis of the system, this relationship can be used to find the rotational axis of the system.

A point external to the cylinder remains at a fixed distance from the centerline/rotational axis and the outside surface of the cylinder as it revolves through one complete revolution. This external point is a point on the surface of a cutting tool.

The rotational axis can be determined precisely relative to an external point. This is performed by relating the external point to the outside surface of an known diameter cylinder. This information can then be used to find the rotational axis of a unknown system.

The rotational axis of an unknown system can be found by orienting and connecting a cylinder with its axis parallel to the unknown rotational system. As the cylinder rotates through a complete revolution, the distance from an external point, on a line through the axis of the rotational system to an outside surface, will vary between a minimum to a maximum. The variation from maximum to minimum can be directly correlated to the difference between the axis of rotation and the centerline of the cylinder.

As the cylinder rotates about the unknown axis of rotation it can float in a plane that is perpendicular to the unknown axis of rotation. At this orientation, the maximum variation of the outside surface can be used to reduce the difference between the unknown axis of rotation and the centerline of the cylinder.

If the external point, which is a point on the surface of a cutting tool, is moved into the path of the maximum variation of the outside surface of the cylinder, interference occurs. As interference occurs, the floating cylinder will move and the axis of the cylinder will move closer to the centerline of the unknown axis of rotation. As the cylinder revolves through one revolution, the external point will only make contact with the maximum point on the cylinder. As the cylinder makes additional revolutions, interference will not occur because the cylinder moved.

Incremental movement of the external point can be continued until the cylinder's axis is coaxial with the unknown system's axis of rotation. Knowing the diameter of the cylinder, the centerline of the cylinder/axis of rotation can be determined relative to the external surface through the outside diameter of the cylinder.

In addition to the above-described steps there are two pieces of process knowledge that are incorporated. The first is knowing when the two axes are coaxial or close enough for the precision required. The second is that the magnitude of the increments of movement of the external surface can cause overshoot error. A series electrical circuit with a battery and a light bulb can be used to determine when the two axes are coaxial. The circuit is used to indicate when the external surface has interference with the cylinder. During rotation, as interference occurs, the circuit is closed and the light will illuminate. The light will stay on during interference and will stop after the maximum has passed and there is no interference. With each incremental movement of the external point toward the axis of rotation, the light will remain illuminated longer as the cylinders axis gets closer to being coaxial with the rotational axis. When the two axes are coaxial, the light will remain on for one complete revolution. The magnitude of the incremental movement on the last step of the external surface will always cause overshoot. The problem with the magnitude of the increments of movement can be resolved relative to the accuracy of the coaxiality of the two axes. The final actual coaxiality can be no worse than the final incremental movement.

As a result, one embodiment provides a rotational acquisition tool having a rotatable mounting body including a first side and a second side opposite the first side. A sleeve has a first end fixedly mounted in the body and a second end extending from the first side. A dynamic cylinder is mounted on the sleeve and includes a radial face slidably abutting the second end of the sleeve. A resilient member is retained in the sleeve and is engaged for exerting a tensile force on the dynamic cylinder sufficient to maintain relative positioning of the radial face on the sleeve.

Another embodiment provides a machine tool system including a machine tool having a true dynamic centerline. A rotatable machine spindle rotates about the true dynamic centerline. A turret is movable along a pair of coordinate axes including an axially extending Z axis and a radially extending X axis. A mounting body is attached for rotation with the spindle and includes a first side and a second side opposite the first side. A sleeve has a first end fixedly mounted in the body and a second end extending from the first side. A dynamic cylinder is mounted on the sleeve and is movable to a position coaxial with the true dynamic centerline. The cylinder includes a radial face slidably abutting the second end of the sleeve. A cutting tool is axially and radially movable with the turret to contact the dynamic cylinder. A resilient member is retained in the sleeve and engaged with the dynamic cylinder for exerting a tensile force on the dynamic cylinder sufficient to maintain dynamic relative positioning of the radial face on the sleeve in response to radial contact of the cutting tool with an annular peripheral surface of the dynamic cylinder. In this manner, the dynamic cylinder is moved to maintain a position coaxial with the true dynamic centerline.

A further embodiment provides a method of locating the true dynamic centerline of a machine tool system. A rotatable machine spindle is mounted on a machine tool having a true dynamic centerline. A turret is mounted on the machine tool for movement along an axially extending Z axis and a radially extending X axis. A mounting body is attached for rotation with the spindle, and includes a first side and a second side opposite the first side. A first end of a sleeve is fixedly mounted in the body and a second end of the sleeve extends from the first side. A dynamic cylinder is mounted on the sleeve and is movable to a position coaxial with the true dynamic centerline. The cylinder has a radial face slidably abutting the second end of the sleeve. A cutting tool is provided on the turret for contacting the dynamic cylinder. A resilient member is retained in the sleeve in engagement with the dynamic cylinder for exerting a tensile force on the dynamic cylinder sufficient to maintain dynamic relative positioning of the radial face on the sleeve in response to radial contact of the cutting tool with an annular peripheral surface of the dynamic cylinder. This provides for movement of the dynamic cylinder to maintain a position coaxial with the true dynamic centerline.

As it can be seen, the principal advantages of these embodiments are first, the substantial limitation of material waste. The oldest and most widely used method, Cut Measure Cut, can result in material waste. With the Cut Measure Cut method there is always the chance that the operator will cut too much material resulting in a wasted piece. The other common approach is to have a set up piece which is discarded, resulting in waste. In addition, as the precision of the dimension desired increases, more cuts are typically required to achieve this higher precision. This increases the amount of time required to produce the part or parts.

The second advantage is that this device easily finds the actual dynamic rotational axis with a simple electrical circuit and a light. This device is a dynamic system which allows it to find the dynamic centerline. Other electronic sensors that exist, do not find the rotational axis dynamically because they are not in a dynamic system. They are mounted outside of the dynamic system and can not compensate for any changes related to it, e.g. temperature, misalignment, machine level and wear.

The last advantage is that the electric circuit and light significantly improve the determination of when the tool is in contact with the cylinder for one complete revolution. With the existing mechanical devices that currently exist it is hard to determine when this point has been achieved. This allows a less skilled person to use this device. When the light stays on for one complete revolution, the dynamic rotational axis is acquired.

Although illustrative embodiments have been shown and described, a wide range of modification change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A rotational axis acquisition tool comprising:
    a rotatable mounting body including a first side and a second side opposite the first side;
    a sleeve having a first end fixedly mounted in the body and a second end extending from the first side;
    a dynamic cylinder mounted on the sleeve, the cylinder including a radial face slidably abutting the second end of the sleeve;
    a resilient member retained in the sleeve and engaged for exerting a tensile force on the dynamic cylinder sufficient to maintain dynamic relative positioning of the radial face on the sleeve;

a tool reference probe extending through the dynamic cylinder, the tool reference probe being engaged with the resilient member; and a compressible member seated between the tool reference probe and the dynamic cylinder.

2. The tool as defined in claim 1 wherein the mounting body is a disk formed of steel.

3. The tool as defined in claim 2 wherein the mounting body includes an aperture formed therethrough for receiving the sleeve.

4. The tool as defined in claim 3 further comprising an insulator member seated in the aperture, the sleeve being seated in the insulator member.

5. The tool as defined in claim 1 further comprising a retainer cap mounted adjacent the second side of the mounting body and engaged with the first end of the sleeve.

6. The tool as defined in claim 5 wherein the resilient member is engaged with the retainer cap.

7. The tool as defined in claim 1 wherein the resilient member urges the dynamic cylinder into engagement with the sleeve and the compressible member urges the tool reference probe away from the dynamic cylinder.

8. The tool as defined in claim 1 further comprising a self-contained power source coupled to an indicator light positioned on the mounting body.

9. A machine tool system comprising:

a machine tool having a true dynamic centerline;

a machine spindle rotatable about the true dynamic centerline;

a turret movable along a pair of coordinate axes including an axially extending Z axis and a radially extending X axis;

a mounting body attached for rotation with the spindle, the mounting body including a first side and a second side opposite the first side;

a sleeve having a first end fixedly mounted in the body and a second end extending from the first side;

a dynamic cylinder mounted on the sleeve and movable to a position coaxial with the true dynamic centerline, the cylinder including a radial face slidably abutting the second end of the sleeve;

a cutting tool axially and radially movable with the turret to contact the dynamic cylinder; and a resilient member retained in the sleeve and engaged with the dynamic cylinder for exerting a tensile force on the dynamic cylinder sufficient to maintain dynamic relative positioning of the radial face on the sleeve in response to radial contact of the cutting tool with an annular peripheral surface of the dynamic cylinder, whereby the dynamic cylinder is moved to maintain a position coaxial with the true dynamic centerline.

10. The tool as defined in claim 9 wherein the mounting body is a disk formed of steel.

11. The tool as defined in claim 10 wherein the mounting body includes an aperture formed therethrough for receiving the sleeve.

12. The tool as defined in claim 11 further comprising an insulator member seated in the aperture, the sleeve being seated in the insulator member.

13. The tool as defined in claim 9 further comprising a retainer cap mounted adjacent the second side of the mounting body and engaged with the first end of the sleeve.

14. The tool as defined in claim 13 wherein the resilient member is engaged with the retainer cap.

15. The tool as defined in claim 14 further comprising a tool reference probe extending through the dynamic cylinder, the tool reference probe being engaged with the resilient member.

16. The tool as defined in claim 15 further comprising a compressible member seated between the tool reference probe and the dynamic cylinder.

17. The tool as defined in claim 16 wherein the resilient member urges the dynamic cylinder into engagement with the sleeve and the compressible member urges the tool reference probe away from the dynamic cylinder.

18. The tool as defined in claim 9 further comprising a self-contained power source coupled to an indicator light positioned on the mounting body.

19. A method of locating the true dynamic centerline of a machine tool system comprising the steps of:

mounting a rotatable machine spindle on a machine tool having a true dynamic centerline;

mounting a turret on the machine tool for movement along an axially extending Z axis and a radially extending X axis;

attaching a mounting body for rotation with the spindle, the mounting body including a first side and a second side opposite the first side;

fixedly mounting a first end of a sleeve in the body, the sleeve having a second end extending from the first side;

mounting a dynamic cylinder on the sleeve, the dynamic cylinder being movable to a position coaxial with the true dynamic centerline, the dynamic cylinder having a radial face slidably abutting the second end of the sleeve;

providing a cutting tool on the turret for movement into contact with the dynamic cylinder; and retaining a resilient member in the sleeve in engagement with the dynamic cylinder for exerting a tensile force on the dynamic cylinder sufficient to maintain dynamic relative positioning of the radial face on the sleeve in response to radial contact of the cutting tool with an annular peripheral surface of the dynamic cylinder, whereby the dynamic cylinder is moved to maintain a position coaxial with the true dynamic centerline.

* * * * *